United States Patent
Jing

(10) Patent No.: US 12,436,923 B2
(45) Date of Patent: Oct. 7, 2025

(54) DISTRIBUTED DATA ACCESS CONTROL AND DATA STORAGE METHOD, METADATA SERVER, AND CLIENT

(71) Applicant: Huawei Technologies Co., Ltd., Shenzhen (CN)

(72) Inventor: Yi Jing, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 86 days.

(21) Appl. No.: 17/216,270

(22) Filed: Mar. 29, 2021

(65) Prior Publication Data

US 2021/0216523 A1 Jul. 15, 2021

Related U.S. Application Data

(63) Continuation of application No. PCT/CN2019/105745, filed on Sep. 12, 2019.

(30) Foreign Application Priority Data

Sep. 29, 2018 (CN) .......................... 201811154007.3

(51) Int. Cl.
*G06F 16/18* (2019.01)
*G06F 16/176* (2019.01)

(52) U.S. Cl.
CPC ...... *G06F 16/1873* (2019.01); *G06F 16/1774* (2019.01)

(58) Field of Classification Search
CPC .......................... G06F 16/1774; G06F 16/1873
See application file for complete search history.

(56) References Cited

U.S. PATENT DOCUMENTS

| | | | | |
|---|---|---|---|---|
| 5,761,659 | A * | 6/1998 | Bertoni | ...................... G06F 9/52 |
| 5,956,712 | A * | 9/1999 | Bennett | ............... G06F 16/1774 |
| 5,956,734 | A * | 9/1999 | Schmuck | |
| 6,144,983 | A * | 11/2000 | Klots | ........................ G06F 9/52 |
| | | | | 718/104 |
| 2003/0187860 | A1* | 10/2003 | Holland | .............. G06F 16/1774 |
| 2004/0133444 | A1* | 7/2004 | Defaix | ...................... G06F 8/71 |
| | | | | 717/122 |

(Continued)

FOREIGN PATENT DOCUMENTS

| | | |
|---|---|---|
| CN | 102339283 A | 2/2012 |
| CN | 105760519 A | 7/2016 |

(Continued)

OTHER PUBLICATIONS

Anonymous:"About NFSv4 file and record locking", Sep. 19, 2015, XP055838849, Retrieved from the Internet: URL:https://web.archive.org/web/20150919064024/https://library.netapp.com/ecmdocs/ECMP1401220/html/GUID-7C87B19A-1909-493F-85D9-838A7B274083.html, 1 Page.

*Primary Examiner* — Marc S Somers
(74) *Attorney, Agent, or Firm* — Conley Rose, P.C.

(57) ABSTRACT

A data storage method includes a first client sending a first lock request for locking a first data range of a first file to a metadata server. The metadata server receives the first lock request from the first client. When the first data range of the first file is not locked, the metadata server locks the first data range of the first file and sends a first lock response to the first client to indicate that the first data range of the first file is locked by the first client.

17 Claims, 10 Drawing Sheets

(56) References Cited

U.S. PATENT DOCUMENTS

| | | |
|---|---|---|
| 2004/0172395 A1* | 9/2004 | Edelstein ................ G06F 16/27 |
| | | 707/999.009 |
| 2004/0220931 A1 | 11/2004 | Guthridge et al. |
| 2005/0228816 A1* | 10/2005 | McCauley ............ G06F 16/219 |
| | | 707/999.102 |
| 2005/0251500 A1 | 11/2005 | Vahalia et al. |
| 2006/0064554 A1* | 3/2006 | Fridella ................. G06F 3/0614 |
| | | 711/151 |
| 2006/0069703 A1* | 3/2006 | Carr ...................... G06F 3/0622 |
| 2008/0140663 A1* | 6/2008 | Jones ................. G06F 16/1774 |
| 2008/0243847 A1 | 10/2008 | Rasmussen |
| 2009/0019047 A1* | 1/2009 | Anderson ........... G06F 16/1774 |
| 2009/0063488 A1* | 3/2009 | Daum ................. G06F 16/2343 |
| 2009/0328041 A1* | 12/2009 | Sudzilouski ............ G06F 9/526 |
| | | 718/100 |
| 2016/0070741 A1 | 3/2016 | Lin et al. |
| 2016/0246834 A1* | 8/2016 | Regni ................. G06F 16/2343 |
| 2018/0246904 A1 | 8/2018 | Reynolds et al. |
| 2021/0263784 A1* | 8/2021 | Richter ................... G06F 9/526 |

FOREIGN PATENT DOCUMENTS

| | | |
|---|---|---|
| CN | 108369498 A | 8/2018 |
| KR | 20170090594 A | 8/2017 |

\* cited by examiner

DISTRIBUTED DATA ACCESS CONTROL AND DATA STORAGE METHOD, METADATA SERVER, AND CLIENT

CROSS-REFERENCE TO RELATED APPLICATIONS

This application is a continuation of International Patent Application No. PCT/CN2019/105745 filed on Sep. 12, 2019, which claims priority to Chinese Patent Application No. 201811154007.3 filed on Sep. 29, 2018. The disclosures of the aforementioned applications are hereby incorporated by reference in their entireties.

TECHNICAL FIELD

The present disclosure relates to the field of distributed file systems, and in particular, to a data storage method, a metadata server, and a client.

BACKGROUND

Due to ever expanding data volume and increasingly complex service logic that are accompanied by continuous development of internet technologies, a conventional centralized system cannot meet service requirements, and a distributed file system is used in more scenarios. The distributed file system usually uses a client/server architecture. Data is stored on a server, and an application on a client can access files on the remote server as if the application accesses a local file system. In the distributed file system, when a plurality of clients to access a same shared resource on the server, a mutual exclusion mechanism is required to prevent interference between the clients, to ensure data consistency. Therefore, a concept of a distributed lock is introduced.

The distributed lock is a core component of the distributed file system, and is used to control concurrent access of a shared resource in the distributed file system. Further, a principle of the distributed lock is that a user needs to obtain operation permission before operating a target resource, another user is prevented from attempting to operate the target resource at the same time, and the other user cannot operate the target resource until the user releases the permission.

A General Parallel File System (GPFS) and a cluster file system (CFS) both provide a distributed lock mechanism. The GPFS and the CFS use an optimistic byte range lock to synchronize file input/output (I/O). In this mechanism, a server returns, to a node that obtains a lock, a maximum lock range (in pages or blocks) that can be obtained currently. When the first node is to write data to a file, the first node obtains a lock of a range of the entire file. As long as another node does not access a same file as the first node, the first node can locally perform all operations on the file without exchanging information with the other node. When the second node is to write data to this file, the server requests to withdraw at least a part of the lock range held by the first node. After receiving the withdrawal request, the first node checks whether the file is still used. If the file is closed, the file lock is released, and the second node can obtain the lock of the range of the entire file. If the file is not closed, only a part of the lock that is not used by the first node is released, so that the second node can obtain a part of the lock range that is required by the second node, to complete a write operation. In this distributed lock mechanism, the server allocates file ranges of different nodes, and when a plurality of nodes to access a same file, a process of lock range release and lock range allocation by the server is relatively cumbersome, resulting in low performance and poor flexibility.

SUMMARY

Embodiments of the present disclosure provide a data storage method, a metadata server, and a client, so that a range of a file can be more flexibly locked, thereby improving efficiency of locking the range of the file, and improving efficiency of concurrently writing data to the file.

According to a first aspect, an embodiment of the present disclosure provides a data storage method, applied to a metadata server side. The method includes a metadata server receives a first lock request sent by a first client, where the first lock request is used to request to lock a first data range of a first file. The metadata server determines whether the first data range of the first file is locked. If the first data range of the first file is not locked, the metadata server locks the first data range of the first file, and sends a first lock response to the first client, to indicate that the first data range of the first file is locked by the first client, where the first data range is used by the first client to write data.

In this embodiment of the present disclosure, a lock request received by the metadata server carries information about a data range that a client requests to lock. If the data range is not locked, the metadata server locks the data range, so that the client modifies data of the locked data range, and a range of a file can be more flexibly locked, thereby improving performance of adding a range lock to the file.

In a possible design, before the metadata server receives the first lock request sent by the first client, the method further includes that the metadata server receives a second lock request sent by the first client, where the second lock request is used to request to lock a first version of the first file. The metadata server determines whether the first file is locked. If the first file is not locked, the metadata server locks the first version of the first file, and sends a second lock response to the first client, to indicate that the first version of the first file is locked.

In this embodiment of the present disclosure, a lock request received by the metadata server carries information about a file version that a client requests to lock. The metadata server locks a file based on the file version that the client requests to lock. After a first version of the file is locked, the client is allowed to modify only content of the first version, but cannot modify another version of the file, to avoid data disorder caused by separately modifying content of different versions of one file by a plurality of clients, thereby ensuring data consistency and reliability of a distributed file.

In a possible design, after the metadata server locks the first version of the first file, the method further includes that the metadata server receives a third lock request sent by a second client, where the third lock request is used to request to lock a second version of the first file. The metadata server determines whether the first file is locked. If the first version of the first file is locked, and the second version is the same as the first version, the metadata server sends a third lock response to the second client, to indicate that the first version of the first file is locked. Then, the metadata server receives a fourth lock request sent by the second client, where the fourth lock request is used to request to lock a second data range of the first file. If the second data range of the first file is not locked, the metadata server locks the second data range of the first file, and sends a fourth lock response to the second client, to indicate that the second data range of the first file is locked by the second client.

In this embodiment of the present disclosure, after a version of a file is locked, content of another version of the file cannot be modified temporarily, to avoid data disorder caused by concurrently modifying different versions of one file by a plurality of clients, thereby ensuring data consistency.

In a possible design, if a third data range in the second data range of the first file is locked, the metadata server locks a data range other than the third data range in the second data range, and sends a fifth lock response to the second client, where the fifth lock response is used to indicate that the data range other than the third data range in the second data range of the first file is locked by the second client.

In this embodiment of the present disclosure, if the second data range that the second client requests to lock includes a locked data range, the metadata server agrees to lock an unlocked data range in the second data range that is locked by the second client, thereby improving efficiency of concurrently writing data to a file.

In a possible design, after the metadata server receives the third lock request sent by the second client, the method further includes that if the first version of the first file is locked, and the second version is different from the first version, the metadata server sends a lock failure indication message to the second client.

In this embodiment of the present disclosure, after a version of a file is locked, content of another version of the file cannot be modified temporarily, to avoid data disorder caused by concurrently modifying different versions of one file by a plurality of clients, thereby ensuring data consistency.

In a possible design, the second lock response includes a first token corresponding to the first version, and the first lock request includes a second token. After the metadata server receives the first lock request sent by the first client, and before the metadata server sends the first lock response to the first client, the method further includes that the metadata server determines whether the second token is the same as the first token. If the second token is the same as the first token, and the first data range of the first file is not locked, the metadata server sends the first lock response to the first client.

In this embodiment of the present disclosure, a client that obtains a version token of a file can request to lock a data range of the file. The metadata server distributes a version token to control whether a client has permission to modify a file, thereby improving control efficiency of the metadata server.

In a possible design, the third lock response includes the first token corresponding to the first version, and the fourth lock request includes a third token. After the metadata server receives the fourth lock request sent by the second client, and before the metadata server sends the fourth lock response to the second client, the method further includes that the metadata server determines whether the third token is the same as the first token. That the metadata server sends a fourth lock response to the second client includes that if the third token is the same as the first token, and the second data range of the first file is not locked, the metadata server sends the fourth lock response to the second client.

In this embodiment of the present disclosure, a client that obtains a version token of a file can request to lock a data range of the file. The metadata server distributes a version token to control whether a client has permission to modify a file, thereby improving control efficiency of the metadata server.

In a possible design, after the metadata server sends the first lock response to the first client, the method further includes that the metadata server receives a first unlock request sent by the first client, where the first unlock request is used to request to unlock the first data range of the first file. The metadata server unlocks the first data range of the first file that is locked by the first client. The metadata server sends a first unlock response to the first client.

In this embodiment of the present disclosure, a client may actively request to unlock a data range of a file, and the metadata server unlocks the data range based on an unlock request sent by the client, to avoid long-term locking of the data range. The unlocked data range can be locked by another client.

In a possible design, after the metadata server sends the second lock response to the first client, the method further includes that the metadata server receives a second unlock request sent by the first client, where the second unlock request is used to request to unlock the first version of the first file. The metadata server unlocks the first version of the first file that is locked by the first client. The metadata server sends a second unlock response to the first client.

In this embodiment of the present disclosure, a client may actively request to unlock a file, and the metadata server unlocks a version of the file based on an unlock request sent by the client, to avoid long-term locking of the version of the file.

In a possible design, after the metadata server locks the first version of the first file, the method further includes that the metadata server starts lock timing of the first file. When the lock timing of the first file reaches a first preset period, if the metadata server has not received an unlock request sent by a client for the first version of the first file, the metadata server unlocks the first version of the first file.

In this embodiment of the present disclosure, the metadata server may detect whether lock timing of a file expires, and unlock a version of the file if the lock timing of the file expires, to avoid long-term locking of the version of the file.

In a possible design, after the metadata server locks the first data range of the first file, the method further includes that the metadata server starts lock timing of the first data range of the first file. When the lock timing of the first data range reaches a second preset period, if the metadata server has not received an unlock request sent by the first client for the first data range, the metadata server unlocks the first data range of the first file that is locked by the first client.

In this embodiment of the present disclosure, the metadata server may detect whether lock timing of a data range of a file expires, and unlock the data range of the file if the lock timing expires, to avoid long-term locking of the data range of the file.

In a possible design, for an expiration record that falls within two lease check periods, a client sends a lock request to trigger to check whether a lease of a file lock/range lock expires. If the lock expires, the lock is released, and a new user is allowed to add a lock. For example, the first client has added a file lock to the first version of the first file, and the file lock expires. When the metadata server receives the lock request sent by the second client for the first version of the first file, the metadata server checks whether the file lock for the first version of the first file expires. If the file lock for the first version of the first file expires, the metadata server unlocks the first version of the first file, and locks the first version of the first file again, to indicate that the first version of the first file is locked by the second client.

The file lock is used to lock a specified version of a specified file. After the specified version is locked, content of another version of the specified file cannot be locked or modified, but only content of the specified version of the specified file can be modified. Another version of the specified file can be locked or modified only after the file lock is released. The range lock is used to lock a specified data range (or referred to as a data range) of a specified file. After the specified data range of the specified file is locked, a holder of the range lock can modify content of the specified data range. After the range lock is released, the specified data range is unlocked, and the specified data range can be locked or modified by another client.

According to a second aspect, an embodiment of the present disclosure provides a data storage method, applied to a first client. The method includes that the first client sends a first lock request to a metadata server, where the first lock request is used to request to lock a first data range of a first file. The first client receives a first lock response sent by the metadata server, where the first lock response is used to indicate that the first data range of the first file is locked by the first client. The first client sends a write request to a storage server, where the write request includes to-be-written data, and the write request is used to request to write the to-be-written data to the first data range.

In this embodiment of the present disclosure, a client may actively request the metadata server to lock a data range of a file, so that the file can be more flexibly locked, thereby improving locking performance of adding a range lock to the file. After the data range is locked, the client may write to-be-written data to the locked data range.

In a possible design, before the first client sends the first lock request to the metadata server, the method further includes that the first client sends a second lock request to the metadata server, where the second lock request is used to request to lock a first version of the first file. The first client receives a second lock response sent by the metadata server, where the second lock response is used to indicate that the first version of the first file is locked, and the second lock response is sent after the metadata server determines that the first file is not locked.

In this embodiment of the present disclosure, a client may actively request the metadata server to lock a version of a file. After a first version of the file is locked, the client is allowed to modify only content of the first version, but cannot modify another version of the file, to avoid data disorder caused by separately modifying content of different versions of one file by a plurality of clients, thereby ensuring data consistency and reliability of a distributed file.

In a possible design, the second lock response includes a first token corresponding to the first version. The first lock request includes a second token, and the second token is used by the metadata server to identify whether the second token is the same as the first token.

In a possible design, after the first client receives the first lock response sent by the metadata server, the method further includes that the first client sends a first unlock request to the metadata server, where the first unlock request is used to request to unlock the first data range of the first file. The first client receives a first unlock response sent by the metadata server.

In this embodiment of the present disclosure, a client may actively request to unlock a data range of a file, and the metadata server unlocks the data range based on an unlock request sent by the client, to avoid long-term locking of the data range. The unlocked data range can be locked by another client.

In a possible design, after the first client receives the second lock response sent by the metadata server, the method further includes that the first client sends a second unlock request to the metadata server, where the second unlock request is used to request to unlock the first version of the first file. The first client receives a second unlock response sent by the metadata server.

In this embodiment of the present disclosure, a client may actively request to unlock a file, and the metadata server unlocks a version of the file based on an unlock request sent by the client, to avoid long-term locking of the version of the file.

According to a third aspect, an embodiment of the present disclosure provides a data storage method, applied to a second client. The method includes that the second client sends a third lock request to a metadata server, where the third lock request is used to request to lock a first file, and the third lock request includes information about a second version of the first file. The second client receives a third lock response sent by the metadata server, where the third lock response is sent after the metadata server determines that a first version of the first file is locked and that the second version is the same as the first version, and the third lock response is used to indicate that the second client is allowed to modify the first version of the first file. The second client sends a fourth lock request to the metadata server, where the fourth lock request is used to request to lock a second data range of the first file. The second client receives a fourth lock response sent by the metadata server, where the fourth lock response is used to indicate that the second client is allowed to modify the second data range of the first file.

In this embodiment of the present disclosure, after a first version of a file is locked, another client can lock only a data range of the first version, to avoid data disorder caused by concurrently modifying different versions of one file by a plurality of clients, thereby ensuring data consistency.

In a possible design, after the second client sends the third lock request to the metadata server, the method further includes that the second client receives a lock failure indication message sent by the metadata server, where the lock failure indication message is sent after the metadata server determines that the first version of the first file is locked and that the second version is different from the first version.

In this embodiment of the present disclosure, after a first version of a file is locked, another client can lock only a data range of the first version, to avoid data disorder caused by concurrently modifying different versions of one file by a plurality of clients, thereby ensuring data consistency.

In a possible design, the third lock response includes a first token corresponding to the first version. The fourth lock request includes a third token, and the third token is used by the metadata server to identify whether the third token is the same as the first token.

According to a fourth aspect, an embodiment of this application provides a metadata server. The metadata server may include a plurality of function modules or units, configured to correspondingly perform the data storage method provided in the first aspect.

According to a fifth aspect, an embodiment of this application provides a client. The client is a first client, and the first client may include a plurality of function modules or units, configured to correspondingly perform the data storage method provided in the second aspect.

According to a sixth aspect, an embodiment of this application provides a client. The client is a second client, and the second client may include a plurality of function modules or units, configured to correspondingly perform the data storage method provided in the third aspect.

According to a seventh aspect, an embodiment of this application provides a metadata server, configured to perform the data storage method provided in the first aspect. The metadata server may include a memory, a processor, a transmitter, and a receiver. The transmitter and the receiver are configured to communicate with another communications device (such as a first client or a second client). The memory is configured to store code for implementing the data storage method provided in the first aspect, and the processor is configured to execute the program code stored in the memory, to perform the data storage method provided in the first aspect.

According to an eighth aspect, an embodiment of this application provides a client. The client is a first client, and is configured to perform the data storage method provided in the second aspect. The first client may include a memory, a processor, a transmitter, and a receiver. The transmitter and the receiver are configured to communicate with another communications device (such as a metadata server). The memory is configured to store code for implementing the data storage method provided in the second aspect, and the processor is configured to execute the program code stored in the memory, to perform the data storage method provided in the second aspect.

According to a ninth aspect, an embodiment of this application provides a client. The client is a second client, and is configured to perform the data storage method provided in the third aspect. The second client may include a memory, a processor, a transmitter, and a receiver. The transmitter and the receiver are configured to communicate with another communications device (such as a metadata server). The memory is configured to store code for implementing the data storage method provided in the third aspect, and the processor is configured to execute the program code stored in the memory, to perform the data storage method provided in the third aspect.

According to a tenth aspect, an embodiment of this application provides a distributed file system. The distributed file system includes a metadata server, a first client, and a second client.

The metadata server may be the metadata server described in the fourth aspect, or may be the metadata server described in the seventh aspect.

The first client may be the first client described in the fifth aspect, or may be the first client described in the eighth aspect.

The second client may be the second client described in the sixth aspect, or may be the second client described in the ninth aspect.

According to an eleventh aspect, an embodiment of this application provides a computer readable storage medium. The readable storage medium stores an instruction, and when the instruction is run on a processor, the processor is enabled to perform the data storage method described in the first aspect.

According to a twelfth aspect, an embodiment of this application provides a computer readable storage medium. The readable storage medium stores an instruction, and when the instruction is run on a processor, the processor is enabled to perform the data storage method described in the second aspect.

According to a thirteenth aspect, an embodiment of this application provides a computer readable storage medium. The readable storage medium stores an instruction, and when the instruction is run on a processor, the processor is enabled to perform the data storage method described in the second aspect.

According to a fourteenth aspect, an embodiment of this application provides a computer program product including an instruction. When the instruction is run on a processor, the processor is enabled to perform the data storage method described in the first aspect.

According to a fifteenth aspect, an embodiment of this application provides a computer program product including an instruction. When the instruction is run on a processor, the processor is enabled to perform the data storage method described in the second aspect.

According to a sixteenth aspect, an embodiment of this application provides a computer program product including an instruction. When the instruction is run on a processor, the processor is enabled to perform the data storage method described in the third aspect.

BRIEF DESCRIPTION OF DRAWINGS

To describe technical solutions in some embodiments of this application more clearly, the following briefly describes the accompanying drawings for describing some of the embodiments of this application.

DESCRIPTION OF EMBODIMENTS

Some terms used in implementations of this application are merely used to explain specific embodiments of this application, but are not intended to limit this application.

Figure 1:
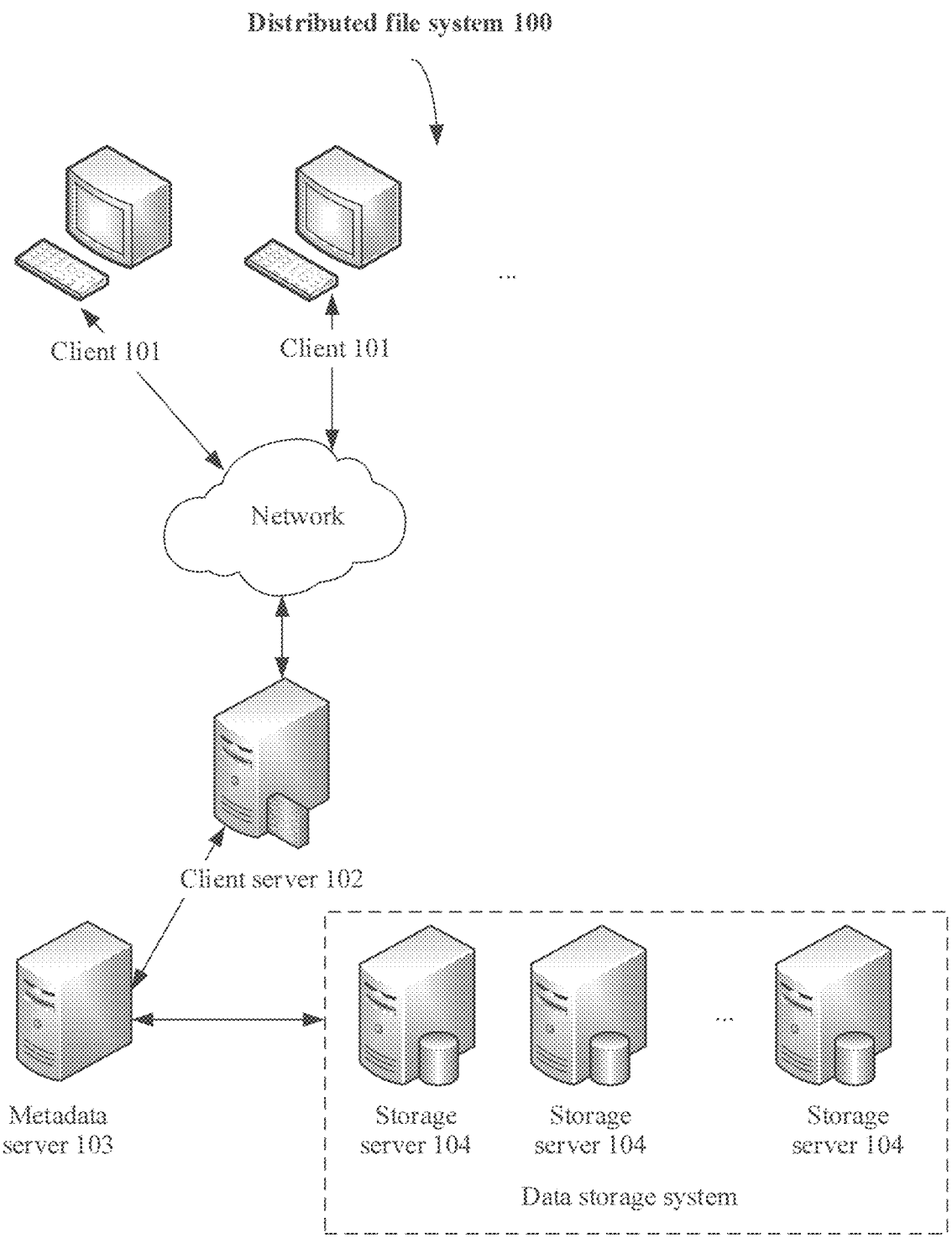
FIG. 1 is a schematic diagram of an architecture of a distributed file system according to an embodiment of the present disclosure.

First, a network architecture in this application is described. FIG. 1 shows a distributed file system described in the embodiments of the present disclosure. A distributed file system 100 includes one or more clients (client) 101 (a first client and a second client are used as examples for description in this application), a client server 102, a metadata server (MDS) 103, and one or more storage servers (SS) 104.

The client 101 may be an electronic device, for example, a desktop computer, a portable computer, or a mobile phone.

The client server 102 is configured to receive an access request of the client 101. The client 101 may be any personal computer (PC) or enterprise PC or another communications device that is globally distributed and that accesses a network. The access request of the client 101 mainly includes some requirements of the client, for example, a required computing capability, software that needs to be deployed, and a test that needs to be performed, a request for locking a file, a request for unlocking a file, a request for locking a range of a file, and a request for unlocking a range of a file. The client server 102 may be an application server.

The metadata server 103 is responsible for maintaining metadata in the file system, including name space, access control, file-block mapping, a block address, and the like, and controlling system-level activities such as garbage collection and load balancing. The metadata server 103 is further configured to receive the access request of the client 101 that is sent by the client server 102.

After receiving the access request of the client 101 that is sent by the client server 102, the metadata server 103 searches for an identity (ID) of a currently available storage server 104, and returns a found ID of the storage server 104 to the client server 102.

After receiving the ID of the storage server 104 that is returned by the metadata server 103, the client server 102 sends access content to the storage server 104. For example, writing a file to the storage server 104 or reading a file from the storage server 104.

The storage server 104 is configured to in response to the access content sent by the client server 102, generate an access result, and return the access result to the client 101 through the client server 102. For example, if the access content is that the client server 102 writes a file to the storage server 104, the client server 102 sends file content to the storage server 104. When the writing is completed, the storage server 104 returns write completion report information to the client server 102. If the access content is that the client server 102 reads file content from the storage server 104, the client server 102 sends a file ID to the storage server 104, and the storage server 104 returns related file content to the client server 102 based on the file ID. Then, the client server 102 returns, to the client 101, the file content read from the storage server 104, to meet a requirement of the client.

The storage server 104 is further responsible for data storage (for example, data storage in blocks), and usually has a local general file system (for example, ext3, ext4, or xfs) or a raw disk file system (supporting block-based device access).

In this application, the client 101, the client server 102, the metadata server 103, and the storage server 104 communicate with each other through a high-speed interconnect network.

Figure 2:
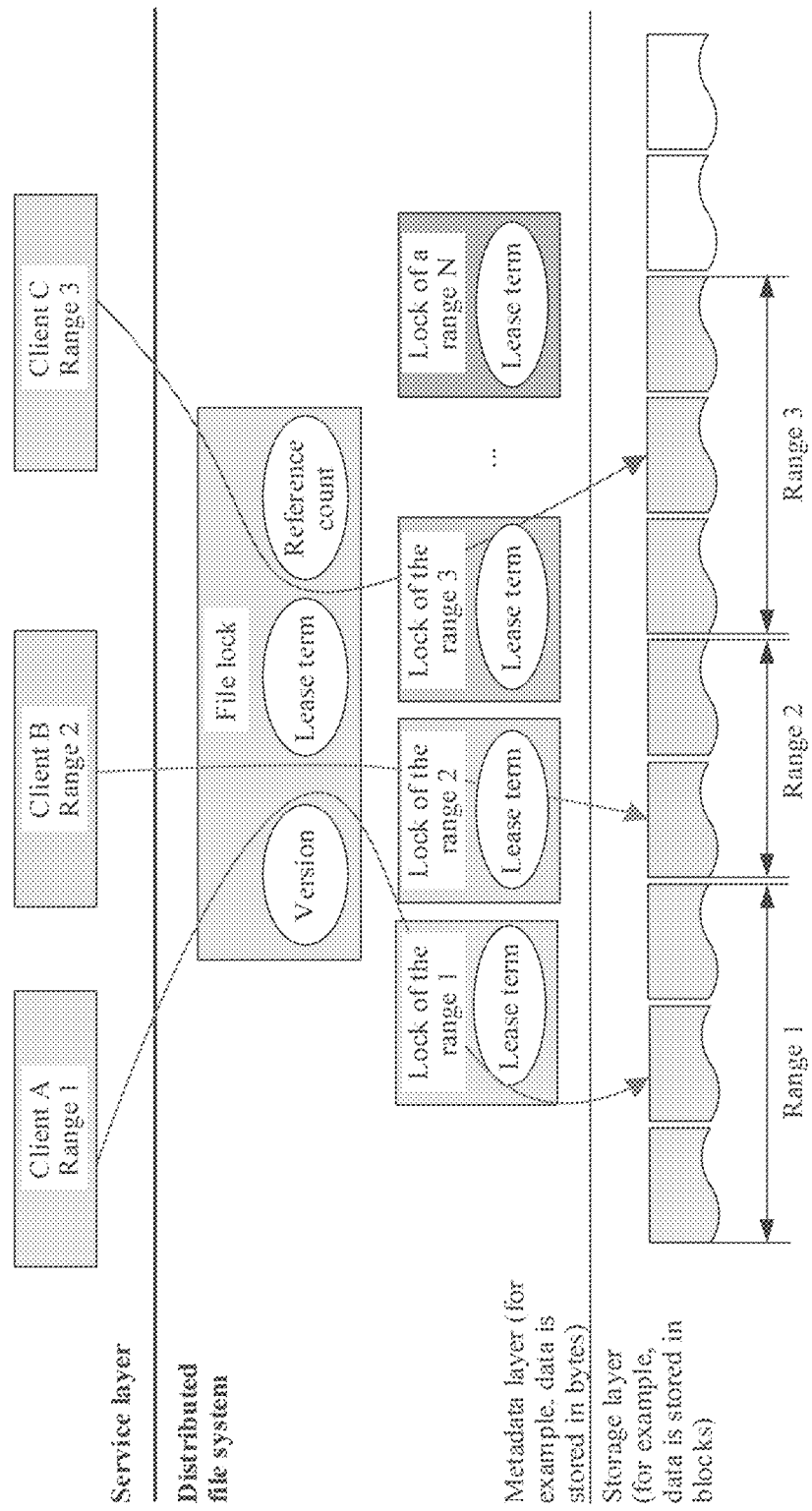
FIG. 2 is a schematic logical diagram of a distributed lock according to an embodiment of the present disclosure.

The following briefly describes a distributed lock mechanism "file lock+range lock" in this application with reference to FIG. 2. A file lock is used to lock a specified version of a specified file. After the specified version is locked, content of another version of the specified file cannot be locked or modified, but only content of the specified version of the specified file can be modified. Another version of the specified file can be locked or modified only after the file lock is released. A range lock is used to lock a specified data range (or a data range) of a specified file. After the specified data range of the specified file is locked, a holder of the range lock can modify content of the specified data range. After the range lock is released, the specified data range is unlocked, and the specified data range can be locked or modified by another client. In actual application, a time sequence of using distributed locks is as follows: adding a file lock→ {adding a range lock→writing data→releasing the range lock}→releasing the file lock. To be specific, a client first locks a specified version of a specified file, then locks a specified data range of the specified file, and next modifies data in the specified data range. After modifying the data, the client releases a range lock for the specified data range, and then releases a file lock for the specified file.

The file lock is controlled in "optimistic lock+version token+lease term+reference count" mode. The file lock can be shared by a plurality of clients, so that the plurality of clients can concurrently access a same version of a same file, thereby improving efficiency of concurrently writing data to the file. The range lock is controlled in "pessimistic lock+lease term" mode. In this way, different users can exclusively use different data ranges of one file, thereby meeting a data consistency requirement. The file lock and the range lock are both controlled by a lease term. If the file lock or the range lock is not released after the file lock or the range lock expires, a system releases the lock. The optimistic lock means that a plurality of clients is allowed to lock a same version of a same file. That is, the plurality of clients can modify content of the same version of the same file. The pessimistic lock means that only one client can lock a same data range of a same file. That is, only one client can modify the same data range of the same file.

The file lock has the following three attributes:

1. Version: The version describes version information of a currently locked file. This attribute needs to be unique. After a file is successfully locked, a version token (token) corresponding to the file is issued to a client. The client that obtains the version token of the file can request to lock a data range of the file.

2. Lease term: A file lock timer records a latest operation time of adding a file lock to a file. If the file lock expires, the file lock is released and the file is unlocked. The file lock timer is updated as follows. The file lock timer can be updated by a plurality of clients. The file lock timer records only a latest file locking operation time. That is, for a locked file, once another client requests to lock the file, the file lock timer needs to update and record a latest locking operation time, to determine, based on the latest recorded locking operation time, whether the file lock expires. A manner of determining whether the file lock expires may be determining whether a difference between the last file locking operation time recorded by the file lock timer and a current system time of a metadata server is greater than or equal to a first preset period (that is, a validity period of the file lock), and if the difference is greater than or equal to the first preset period, determining that the file lock expires, and unlocking the file.

3. Reference count: Because a file lock can be shared by a plurality of clients, a reference count of the file lock needs to be recorded. When a reference count of a file lock for a file is greater than 0, it indicates that a client still locks the file. When the reference count of the file is equal to 0, it indicates that no client locks the file.

In consideration of I/O throughput performance, a bottom layer of a storage server usually stores data in a block alignment manner. Therefore, a client server maps a byte offset requested by a client to a block offset, and then submits the block offset to a metadata server. The range lock provides the following two locking modes:

1. Range overlapping is not supported.

In this mode, if there is a locked block in a range, a system returns a lock failure. For example, a client A, a client B, and a client C in FIG. 2 separately lock different ranges of one file.

2. Range overlapping is supported.

The file lock has ensured version consistency, and the range lock is used to improve a concurrent write speed. Therefore, if some blocks in a range specified by a service layer have been locked, a system allows the remaining unlocked blocks to be locked. The system may return a set of blocks that are allowed to be locked. For example, a client A has locked a first data range, and a client B requests to lock a second data range of a same file. If the first data range and the second data range do not overlap, a metadata server may return a lock success message to the client B. Optionally, the lock success message may further include range information of the second data range, for example, blocks 0 to 9 or bytes 1 to 3. If the first data range overlaps the second data range, the metadata server allocates a data range other than an overlapped part in the second data range to the client B, and the metadata server returns a lock success message to the client B. The lock success message includes range information of the data range other than the overlapped part in the second data range. For example, if the first data range is blocks 0 to 5, and the second data range is blocks 4 to 9, the lock success message returned by the metadata server to the client B includes a valid data range: blocks 6 to 9. The range lock also has an attribute of a lease term. Because the range lock is exclusively occupied by a client, a latest time at which the client accesses a data range also needs to be recorded. If the client does not access the data range before the range lock expires, the range (data range) can be forcibly unlocked and locked by another client. A manner of determining whether the range lock expires may be determining whether a difference between the latest time at which the client accesses the data range and that is recorded by a range lock timer and a current system time of a metadata server is greater than or equal to a second preset period (that is, a validity period of the range lock), and if the difference is greater than or equal to the second preset period, determining that the range lock expires, and unlocking the data range.

One client can add range locks to a plurality of data ranges of a file within a file lock lease term.

The following describes in detail a distributed lock mechanism of "file lock+range lock" in this application with reference to a specific method embodiment.

Figure 3:
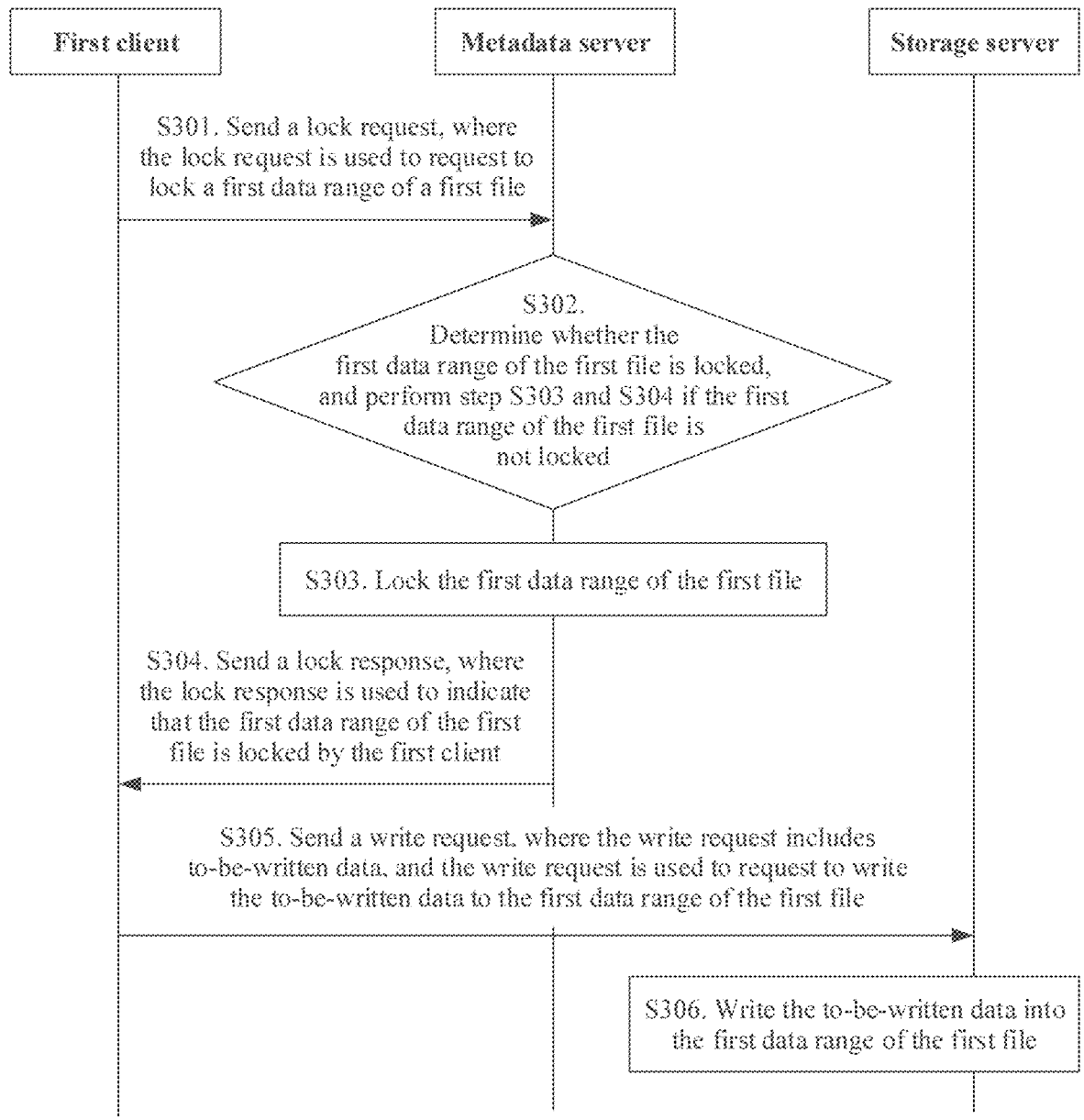
FIG. 3 is a schematic flowchart of a data storage method according to an embodiment of the present disclosure.

Based on the distributed file system in FIG. 1, FIG. 3 provides a flowchart of a data storage method. The method includes the following steps.

S301. A first client sends a lock request to a metadata server, and the metadata server receives the lock request sent by the first client, where the lock request is used to request to lock a first data range of a first file. S302. The metadata server determines whether the first data range of the first file is locked, and performs step S303 if the first data range of the first file is not locked.

S303. The metadata server locks the first data range of the first file, and performs step S304.

S304. The metadata server sends a lock response to the first client, and the first client receives the lock response sent by the metadata server, where the lock response is used to indicate that the first data range of the first file is locked by the first client.

S305. The first client sends a write request to a storage server, where the write request includes to-be-written data, and the write request is used to request to write the to-be-written data to the first data range of the first file.

S306. The storage server receives the write request sent by the first client, and writes the to-be-written data carried in the write request to the first data range of the first file.

The first file is a file that has been stored in the storage server in the distributed file system.

In this embodiment of the present disclosure, information may be sent by a client to the metadata server through a client server. For example, that a first client sends a lock request to a metadata server includes that the first client sends the lock request to the client server, and the client server receives the lock request sent by the first client. The client server forwards the lock request to the metadata server, and the metadata server receives the lock request sent by the client server. Similarly, information sent by the metadata server to the client may also be forwarded by the client server. For example, that the metadata server sends a lock response to the first client includes that the metadata server sends the lock response to the client server, and the client server receives the lock response sent by the metadata server. The client server sends the lock response to the first client, and the first client receives the lock response sent by the client server.

The lock request may include range information of the first data range of the first file. The storage server may store data in blocks (block), and different blocks have different indexes. The first client may request the first data range in bytes. Therefore, the client server may map a byte requested by the first client to a block, and then submit the block to the metadata server. For example, a first data range requested by a client A is bytes 1 to 3, and the client server maps the bytes 1 to 3 to blocks 0 to 9 according to a mapping relationship between a byte and a block, and submits the 10 blocks to the metadata server. The metadata server allows the client A to lock the blocks 0 to 9. Therefore, the client A may subsequently request the storage server to write data to the blocks 0 to 9.

"The first data range of the first file is locked" described in this embodiment of the present disclosure further includes that another client is prevented from modifying content of the first data range within a lease term in which the first client locks the first data range.

That the metadata server locks the first data range of the first file may include that the metadata server locally records a lock event that the first data range of the first file is locked by the first client. For example, the metadata server records a state of the first data range of the first file as a state in which a range lock has been added, and the range lock is held by the first client. The first client may modify the first data range of the first file, for example, write data to the first data range of the first file.

Optionally, after locking the first data range of the first file, the metadata server may further start a range lock timer to record an operation time in which the range lock is added to the first data range of the first file. When the operation time reaches a second preset period, if the first client has not released the range lock, it indicates that the range lock expires, and the data range is unlocked, to avoid long-term locking of the data range. A manner of detecting whether the operation time in which the range lock is added to the first data range of the first file reaches the second preset period may be determining whether a difference between a current time and a start time of the operation time is greater than or equal to the second preset period. For example, the second preset period may be 10 minutes.

Optionally, within a lease term of the range lock, if the first client completes the write operation, the first client may actively release the range lock, to unlock the first data range. Another client may request to add a range lock to the first data range for which the range lock is released. For example, the first client sends an unlock request to the metadata server, and the metadata server receives the unlock request sent by the first client. The unlock request is used to request to unlock the first data range of the first file. The metadata server unlocks the first data range of the first file that is locked by the first client. Herein, that the metadata server unlocks the first data range of the first file that is locked by the first client may include that the metadata server locally deletes the lock event that the first data range of the first file is locked by the first client. For example, the metadata server modifies the state of the first data range of the first file to a state in which no range lock is added.

In this embodiment of the present disclosure, a client may actively request the metadata server to lock a data range of a file, so that the range of the file can be more flexibly locked. Different clients may lock different data ranges of one file, to perform write operations on the different data ranges of the one file, thereby improving efficiency of concurrently writing data to the file.

Figure 4:
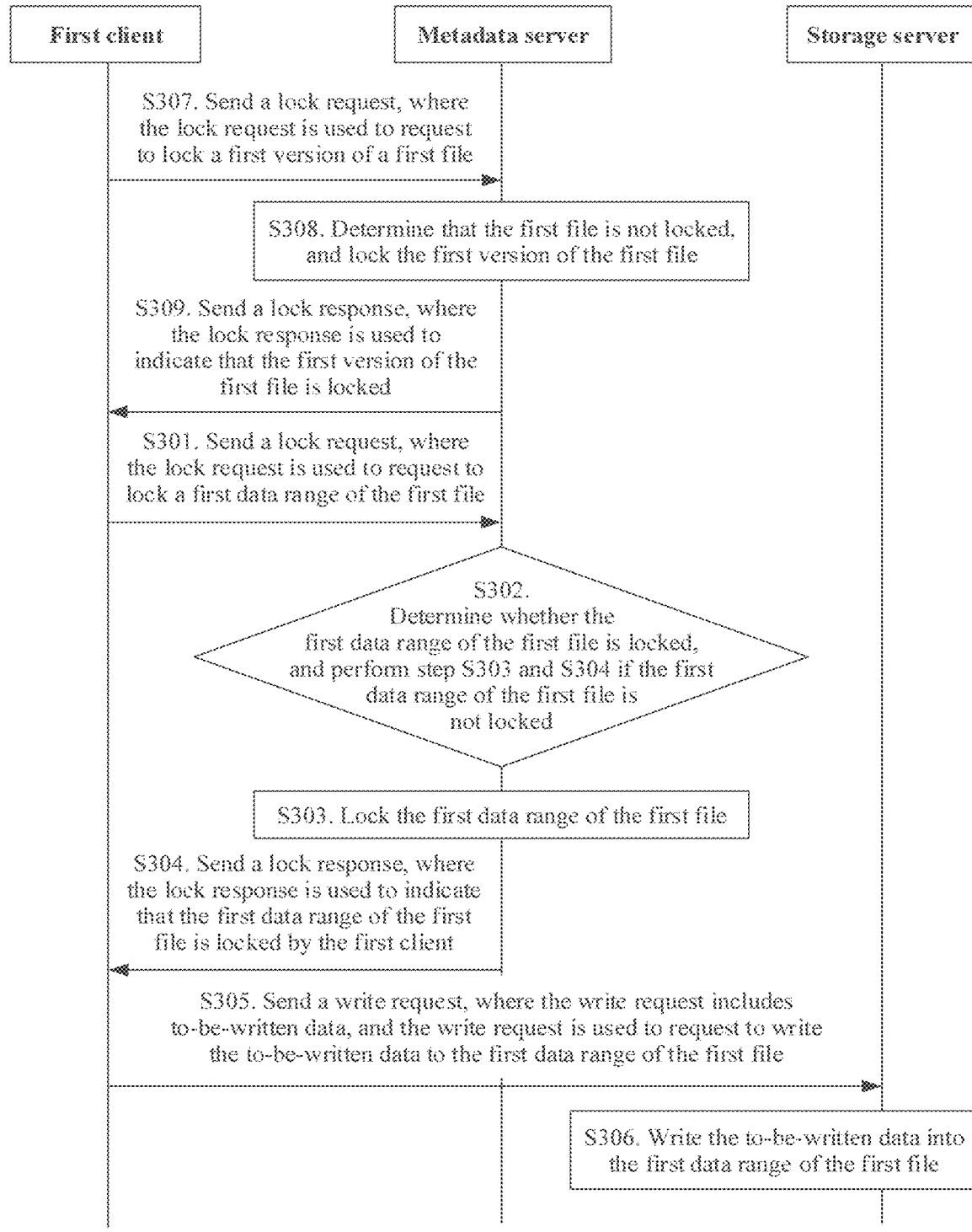
FIG. 4 is a schematic flowchart of another data storage method according to an embodiment of the present disclosure.

Optionally, referring to FIG. 4, before the first client sends the first lock request to the metadata server, the method further includes steps S307 to S309, to request the metadata server to lock the first file.

S307. The first client sends a lock request to the metadata server, and the metadata server receives the lock request sent by the first client, where the lock request is used to request to lock a first version of the first file.

S308. If the metadata server determines that the first file is not locked, the metadata server locks the first version of the first file, and performs step S309.

S309. The metadata server sends a lock response to the first client, and the first client receives the lock response sent by the metadata server, where the lock response is used to indicate that the first version of the first file is locked.

Information about the first version may be a version number or the like of the first version.

"The metadata server locks the first version of the first file" described in this embodiment of the present disclosure further includes that a client is prevented from modifying content of another version of the first file within a lease term in which the first version of the first file is locked. For example, if the first client requests to lock a version 1 of a file 1, after the metadata server locks the version 1 of the file 1, the first client and another client cannot modify another version of the file 1. The first client or the other client can request to modify another version of the file 1 only after the metadata server unlocks the version 1 of the file 1.

After the first version of the first file is successfully locked, if the first client needs to perform a write operation on a specified data segment, the first client needs to request a range lock in data ranges. For details, refer to steps S301 to S306.

That the metadata server locks the first version of the first file may include that the metadata server locally records a lock event that the first version of the first file is locked. For example, the metadata server records a state of the first version of the first file as a state in which a file lock has been added, and optionally, the metadata server may further record that the file lock is held by the first client. Within a lease term of the first version of the first file, a client other than the first client may also request to lock a specified data range of the first version of the first file, to modify content of the specified data range. That is, for a same version of a same file, a plurality of clients may be allowed to concurrently access different data ranges of the file, thereby improving concurrency efficiency of the system.

Optionally, after locking the first version of the first file, the metadata server may further start a file lock timer to record an operation time in which the file lock is added to the first version of the first file. When the operation time reaches a first preset period, if the client that has requested to lock the first version of the first file has not completely released the file lock for the first file, it indicates that the file lock expires, and the first version of the first file is unlocked, to avoid long-term locking of a version of a file. A manner of detecting whether the operation time in which the file lock is added to the first version of the first file reaches the first preset period may be determining whether a difference between a current time and a start time of the operation time is greater than or equal to the first preset period. For example, the first preset period may be 20 minutes. Because the first file is concurrently accessed by a plurality of clients, the plurality of clients needs to release the file lock within the lease term of the file lock. Otherwise, after the operation time recorded by the file lock timer expires, the first version of the first file needs to be unlocked.

Optionally, within the lease term of the file lock, if the first client no longer needs to process the first version of the first file, the first client may actively release the file lock, to stop modifying the first version of the first file. For example, the first client sends an unlock request to the metadata server, and the metadata server receives the unlock request sent by the first client. The unlock request is used to request to unlock the first version of the first file. The metadata server unlocks the first version of the first file that is locked by the first client. In this case, if no client other than the first client locks the first version of the first file, the metadata server unlocks the first version of the first file. For example, the metadata server modifies a reference count of the file lock for the first file to 0, to indicate that no file lock is added to the first file currently. If a client other than the first client modifies the first version of the first file, the metadata server decreases the reference count of the file lock for the first file by 1, and cannot unlock the first version of the first file until all clients unlock the first version of the first file. Alternatively, the metadata server unlocks the first version of the first file only when the file lock expires.

Optionally, in step S308, after locking the first version of the first file, the metadata server may further generate a token corresponding to the first version of the first file, and send the generated token to the first client. A version token represents permission to modify a version. A client that obtains a version token can modify content of a corresponding version of a file, and a client that does not obtain the version token has no permission to modify the content of the corresponding version of the file. For example, if both a client 1 and a client 2 have a token corresponding to the version 1 of the file 1, and a client 3 does not have the token corresponding to the version 1 of the file 1, the client 1 and the client 2 can request the metadata server to lock a data range of the version 1 of the file 1 and write data to the data range, but the client 3 cannot request to lock a data range of the version 1 of the file 1 or write data to the data range. For example, the metadata server sends, to the first client, a lock response that carries the token corresponding to the first version. The first client receives the token sent by the metadata server. The token corresponding to the first version needs to be carried in another request (for example, a lock request or an unlock request) subsequently initiated by the first client. The metadata server identifies the token carried in the request sent by the first client, to determine whether the first client has permission to lock a data range of the first file.

For example, a lock request sent by the first client to the metadata server includes a second token, and the lock request is used to request to lock the first data range of the first file. After the metadata server receives the lock request, the metadata server determines whether the second token is the same as a first token. If the second token is the same as the first token, and the first data range of the first file is not locked, the metadata server locks the first data range of the first file, and sends a lock response to the first client. Herein, the metadata server may use a token to control a client that has permission to lock a data range of the first file, and a client that obtains the token of the first version may request the metadata server to lock a data range of the first file. Different tokens may be set for different files or different versions of one file.

Optionally, in step S308, after locking the first version of the first file, the metadata server may further generate an identifier corresponding to the first client, and send the identifier to the first client. Identifiers are used to distinguish different clients. The identifier may be a session ID. The metadata server generates different identifiers for different clients. The identifier is unique, and different clients have different identifiers. For example, the metadata server sends, to the first client, a lock response that carries the identifier. The first client receives the identifier sent by the metadata server, and the identifier needs to be carried in another request (for example, a lock request or an unlock request) subsequently initiated by the first client. The metadata server identifies the first client by identifying the identifier carried in the request sent by the first client. For example, if a lock request sent by the first client to the metadata server includes the first identifier, the metadata server determines, based on the identifier, that a client that sends the lock request is the first client. The metadata server may generate different identifiers for different clients, to distinguish the different clients.

In this embodiment of the present disclosure, when requesting the metadata server to lock a file, a client may indicate version information of the file, to request to lock a version of the file, so as to prevent another client from modifying another version of the file, thereby avoiding file data disorder caused by concurrently modifying different versions of one file by different clients, and ensuring data consistency and reliability.

Figure 5A:
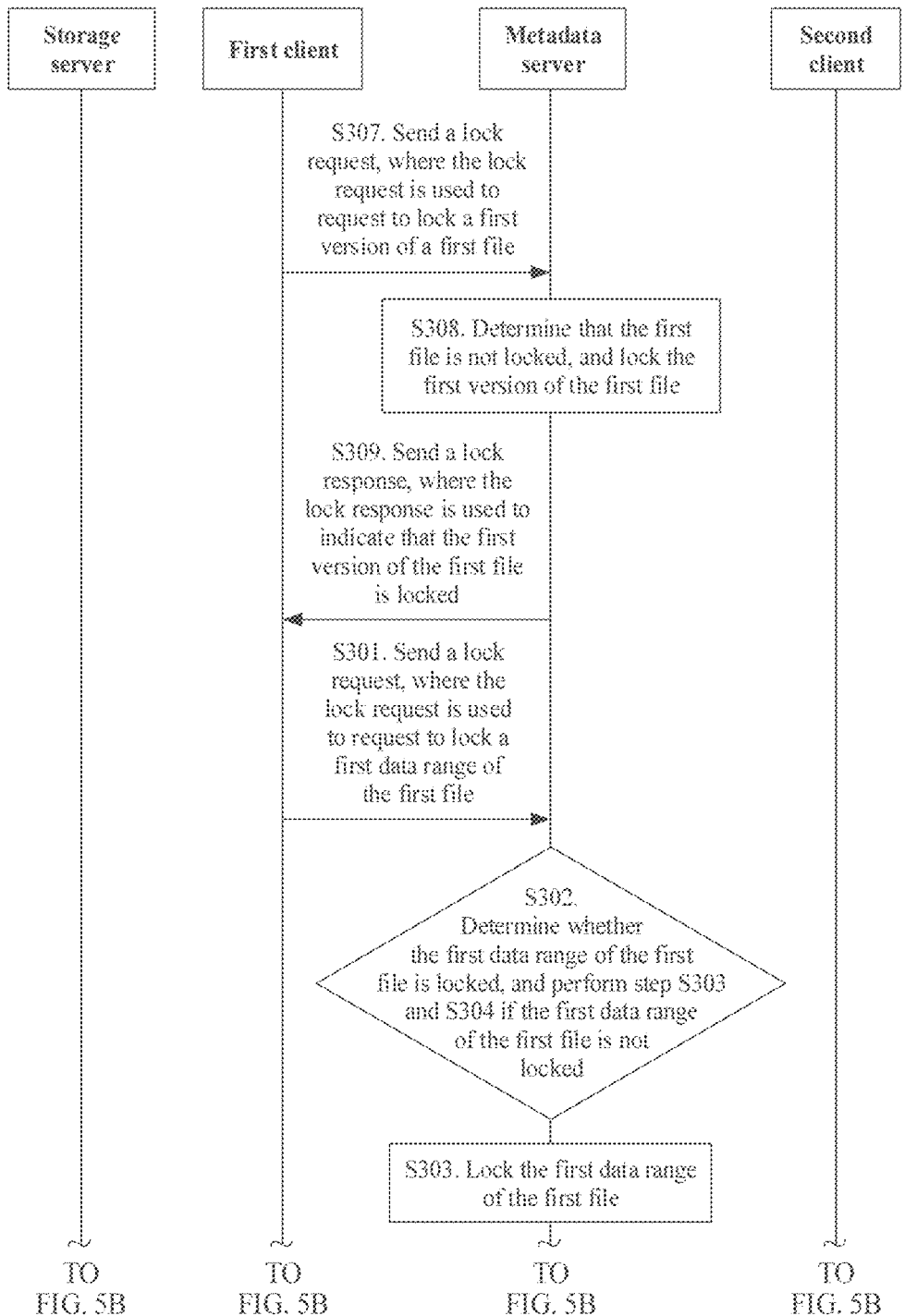
FIG. 5A, FIG. 5B, and FIG. 5C are a schematic flowchart of another data storage method according to an embodiment of the present disclosure.
Figure 5B:
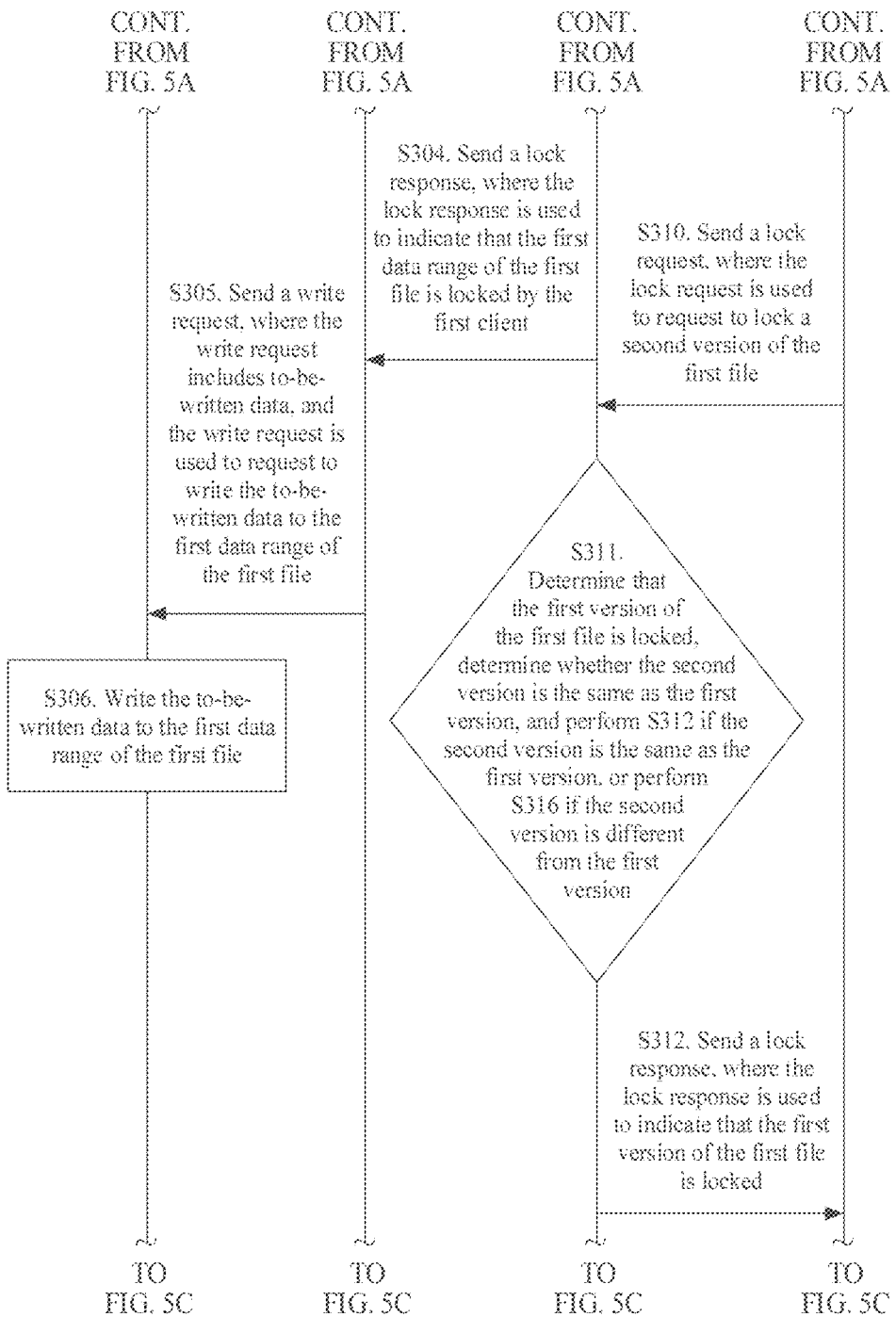
Figure 5C:
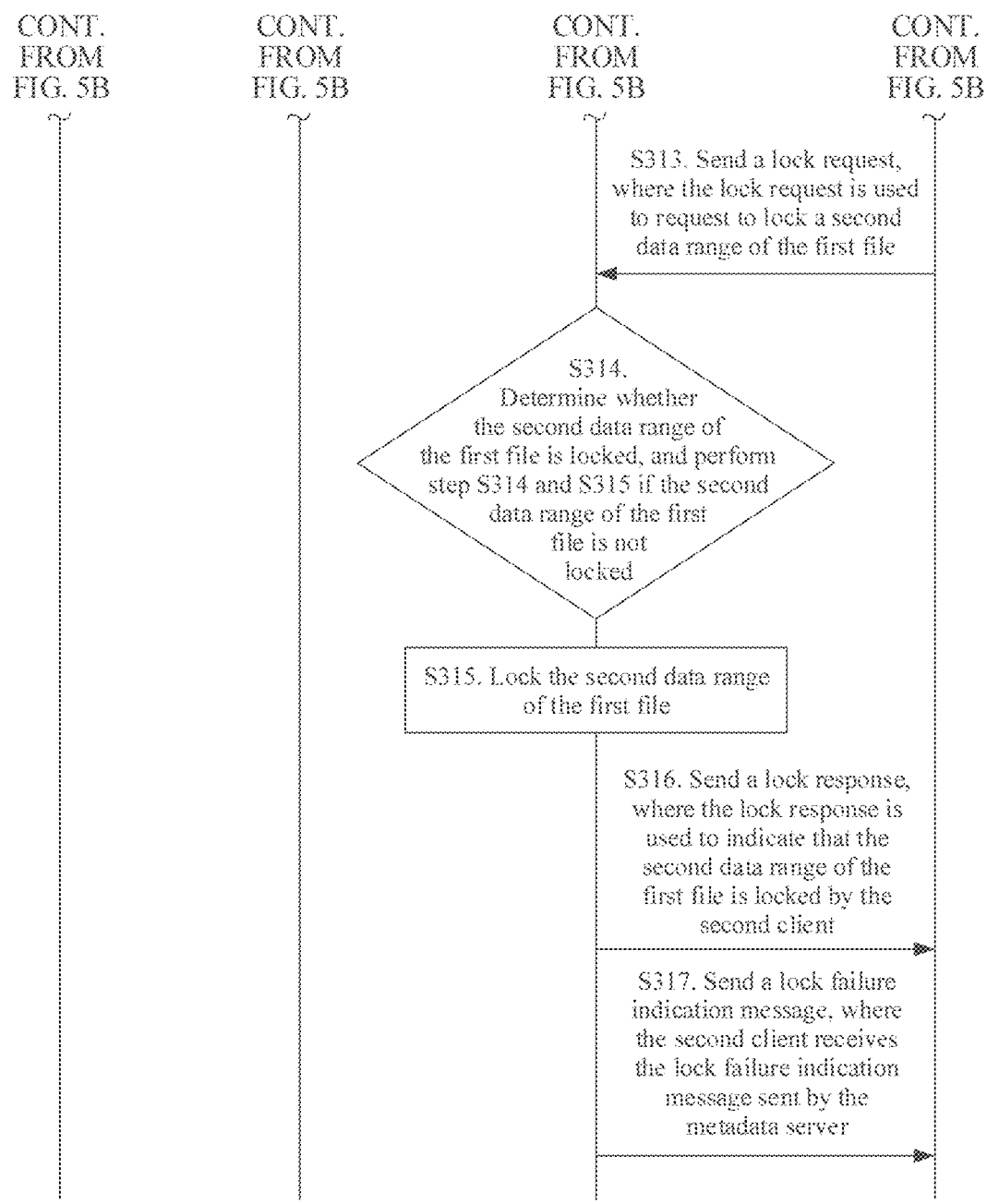

Optionally, referring to FIG. 5A to FIG. 5C, after the metadata server locks the first version of the first file, the method further includes steps S310 to S317.

S310. A second client sends a lock request to the metadata server, and the metadata server receives the lock request sent by the second client, where the lock request is used to request to lock a second version of the first file.

S311. The metadata server determines that the first version of the first file is locked, and the metadata server determines whether the second version is the same as the first version, and performs step S312 if the second version is the same as the first version, or performs step S317 if the second version is different from the first version.

S312. The metadata server sends a third lock response to the second client, and the second client receives the third lock response sent by the metadata server, where the third lock response is used to indicate that the first version of the first file is locked.

S313. The second client sends a lock request to the metadata server, and the metadata server receives the lock request sent by the second client, where the lock request is used to request to lock a second data range of the first file.

S314. The metadata server determines whether the second data range of the first file is locked, and performs steps S315 and S316 if the second data range of the first file is not locked. S315. The metadata server locks the second data range of the first file.

S316. The metadata server sends a lock response to the second client, and the second client receives the lock response sent by the metadata server, where the lock response is used to indicate that the second data range of the first file is locked by the second client.

S317. The metadata server sends a lock failure indication message to the second client, and the second client receives the lock failure indication message sent by the metadata server.

It should be noted that the first version is a version locked by a client A, and the second version is a version that a client B requests to lock. The first version and the second version are merely used to distinguish names, to distinguish the version locked by the client A and the version that the client B requests to lock. After receiving a third lock request sent by the client B, the metadata server needs to determine whether the second version is the same as the first version. If the second version is the same as the first version, it indicates that the client B also needs to lock the same version of the same file. If the second version is different from the first version, it indicates that the client B requests to lock another version of the same file.

Optionally, if a third data range in the second data range of the first file is locked, the metadata server locks a data range other than the third data range in the second data range, and sends a lock response to the second client. The lock response is used to indicate that the data range other than the third data range in the second data range of the first file is locked by the second client.

Optionally, after locking the second data range of the first file, the metadata server may further start a range lock timer to record an operation time in which a range lock is added to the second data range of the first file. When the operation time reaches the second preset period, if the second client has not released the range lock, it indicates that the range lock expires, and the second data range is unlocked, to avoid long-term locking of the data range. A manner of detecting whether the operation time in which the range lock is added to the second data range of the first file reaches the second preset period may be determining whether a difference between a current time and a start time of the operation time is greater than or equal to the second preset period. For example, the second preset period may be 10 minutes. Alternatively, the second preset period may be determined based on a value obtained by multiplying a write timeout period of a single block by a quantity of blocks. It should be noted that validity periods of range locks for different data ranges may be the same or different. For example, a validity period of the range lock for the first data range is 10 minutes, and a validity period of the range lock for the second data range is 20 minutes. A validity period of a range lock may be set by a system of the metadata server by default, or may be manually set by an administrator. This is not limited in this application.

Optionally, within a lease term of the range lock, if the second client completes the write operation, the second client may actively release the range lock, to unlock the second data range. Another client may request to add a range lock to the second data range for which the range lock is released. For example, the second client sends an unlock request to the metadata server, and the metadata server receives the unlock request sent by the second client. The unlock request is used to request to unlock the second data range of the first file. The metadata server unlocks the second data range of the first file that is locked by the second client. Herein, that the metadata server unlocks the second data range of the first file that is locked by the second client may be The metadata server locally deletes a lock event that the second data range of the first file is locked by the second client. For example, the metadata server modifies a state of the second data range of the first file to a state in which no range lock is added.

Within a period in which the first version of the first file is locked, another client can modify only this version, but cannot request to modify content of another version of the first file, to avoid data disorder.

Optionally, in step S312, if the second version is the same as the first version, the metadata server increases the reference count of the file lock for the first file by 1, to indicate that a client other than the first client also requests to lock the first file. In addition, because a new client requests to lock the first version of the first file, the metadata server updates the file lock timer for the first file. The file lock timer records an operation time in which the file is locked by the second client, to determine, based on the updated operation time, whether the file lock expires.

Optionally, within the lease term of the file lock, if the second client no longer needs to modify the first file, the second client may actively release the file lock, to stop modifying the first version of the first file. For example, the second client sends an unlock request to the metadata server, and the metadata server receives the unlock request sent by the second client. The unlock request is used to request to unlock the first version of the first file. The metadata server unlocks the first version of the first file that is locked by the second client. In this case, if no client other than the second client locks the first version of the first file, the metadata server unlocks the first version of the first file. For example, the metadata server modifies the reference count of the file lock for the first file to 0, to indicate that no file lock is added to the first file currently. If a client other than the second client modifies the first version of the first file, the metadata server decreases the reference count of the file lock for the first file by 1, and cannot unlock the first version of the first file until all clients unlock the first version of the first file, or until the file lock expires.

Optionally, in step S312, if the second version is the same as the first version, the metadata server may further send, to the second client, a lock response that carries the token corresponding to the first version. The second client receives the token that corresponds to the first version and that is sent by the metadata server. The token corresponding to the first version needs to be carried in another request (for example, a lock request or an unlock request) subsequently initiated by the second client. The metadata server identifies the token carried in the request sent by the second client, to determine whether the second client has permission to lock a data range of the first file.

Optionally, in step S312, if the second version is the same as the first version, the metadata server may further generate an identifier corresponding to the second client, and send the identifier to the second client. For example, the metadata server sends, to the second client, a lock response that carries the identifier. The second client receives the identifier sent by the metadata server, and the identifier needs to be carried in another request (for example, a lock request or an unlock request) subsequently initiated by the second client. The metadata server identifies the second client by identifying the identifier carried in the request sent by the second client. For example, if a lock request sent by the second client to the metadata server includes the identifier, the metadata server determines, based on the identifier, that a client that sends the lock request is the second client. The metadata server may generate different identifiers for different clients, to distinguish the different clients.

In this embodiment of the present disclosure, a plurality of clients can concurrently write data to different data ranges of one version of one file, thereby improving efficiency of concurrently writing data to the file. In addition, when a version of the file is locked, another client cannot request to modify content of another version of the file, to avoid data disorder caused by modifying content of different versions of one file by a plurality of clients, thereby ensuring data consistency and reliability of a distributed file.

This application provides the following two expiration processing manners for reclaiming a file lock or a range lock.

Manner 1: The metadata server periodically checks file leases in the background, and releases a range lock and/or a file lock that expire/expires but are/is not released. For example, the metadata server periodically checks whether a time difference between a current system time and a latest operation time, recorded by the range lock timer, for adding the range lock to the first data range of the first file is greater than or equal to a preset range lock period. If the time difference is greater than or equal to the preset range lock period, it indicates that the range lock expires, and the metadata server unlocks the first data range of the first file. Alternatively, the metadata server periodically checks whether a time difference between a current system time and a latest operation time, recorded by the file lock timer, for adding the file lock to the first version of the first file is greater than or equal to a preset file lock period. If the time difference is greater than or equal to the preset file lock period, it indicates that the file lock expires, and the metadata server unlocks the first version of the first file.

Manner 2: For an expiration record that falls within two lease check periods, a client sends a lock request to trigger to check whether a lease of a file lock/range lock expires. If the lock has expired, the lock is released, and a new user is allowed to add a lock. For example, the first client has added a file lock to the first version of the first file, and the file lock expires. When the metadata server receives the lock request sent by the second client for the first version of the first file, the metadata server checks whether the file lock for the first version of the first file expires. If the file lock for the first version of the first file expires, the metadata server unlocks the first version of the first file, and locks the first version of the first file again, to indicate that the first version of the first file is locked by the second client.

In this embodiment of the present disclosure, a distributed lock mechanism "file lock+user-defined range lock" can improve concurrent write efficiency of a file in this application. This application is applicable to, but not limited to, a content distribution network (CDN) scenario on the internet, and can implement concurrency, segmentation, and high-concurrency write of large files, implement fast content ingestion, and improve ingestion efficiency. In this application, content can be concurrently ingested by segment, and some content that is successfully ingested provides a service. This improves a CDN hit rate, reduces retrieval traffic, reduces bandwidth costs, reduces a response time, and improves user experience.

It should be noted that "A and/or B" in this application includes three possible cases. For example, only A exists, only B exists, and both A and B exist.

The foregoing mainly describes solutions provided in the embodiments of this application from a perspective of interaction between the network devices. It may be understood that, to implement the foregoing functions, each network device, for example, the metadata server, the first client, and the second client, includes a corresponding hardware structure and/or software module for performing the functions. A person of ordinary skill in the art should easily be aware that, in combination with the examples described in the embodiments disclosed in this specification, network devices and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the metadata server, the first client, and the second client may be divided into function modules based on the foregoing method examples. For example, each function module may be obtained through division based on each corresponding function, or two or more functions may be integrated into one processing module. The integrated module may be implemented in the form of hardware, or may be implemented in the form of a software function module. It should be noted that, in the embodiments of this application, division into the modules is used as an example, and is merely logical function division. In an actual implementation, another division manner may be used.

Figure 6:
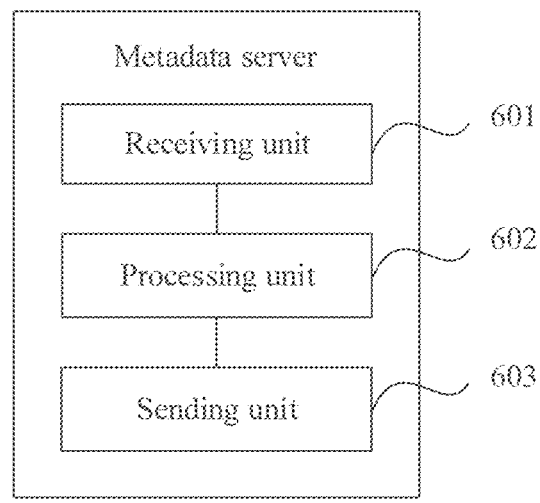
FIG. 6 is a schematic diagram of a logical structure of a metadata server according to an embodiment of the present disclosure.

When the function modules are obtained through division based on corresponding functions, FIG. 6 is a possible schematic diagram of a logical structure of the metadata server in the foregoing embodiments. A metadata server 600 includes a receiving unit 601, a processing unit 602, and a sending unit 603. The receiving unit 601 is configured to support the metadata server in performing the steps in which the metadata server receives information in the method embodiments shown in FIG. 3 to FIG. 5C. The sending unit 603 is configured to support the metadata server in performing the steps in which the metadata server sends information in the method embodiments shown in FIG. 3 to FIG. 5C. The processing unit 602 is configured to support the metadata server in performing the steps in which the metadata server determines information in the method embodiments shown in FIG. 3 to FIG. 5C, a function other than functions of the sending unit and the receiving unit, and the like.

In hardware implementation, the processing unit 602 may be a processor, a processing circuit, or the like. The receiving unit 601 may be a receiver, a receiver circuit, or the like. The sending unit 603 may be a transmitter, a transmitter circuit, or the like. The sending unit 603 and the receiving unit 601 may form a communications interface.

Figure 7:
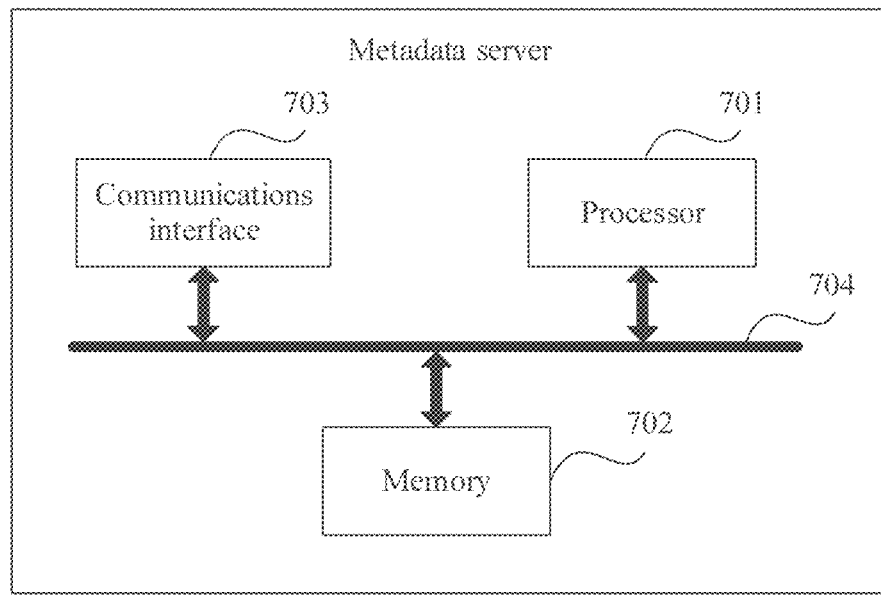
FIG. 7 is a schematic diagram of a hardware structure of a metadata server according to an embodiment of the present disclosure.

FIG. 7 is a possible schematic diagram of a hardware structure of a metadata server in the foregoing embodiments according to an embodiment of this application. The metadata server includes a processor 701. In this embodiment of this application, the processor 701 is configured to control and manage an action of the metadata server. For example, the processor 701 is configured to support the metadata server in performing steps such as locking the first version of the first file and locking the first data range of the first file in the embodiments. Optionally, the metadata server may further include a memory 702 and a communications interface 703. The processor 701, the communications interface 703, and the memory 702 may be connected to each other or connected to each other through a bus 704. The memory 702 is configured to store code and data of the metadata server. The communications interface 703 is configured to support communication of the metadata server. The bus 704 may be a Peripheral Component Interconnect (PCI) bus, an Extended Industry Standard Architecture (EISA) bus, or the like.

The processor 701 may be a central processing unit (CPU), a general-purpose processor, a digital signal processor (DSP), an application-specific integrated circuit (ASIC), a field-programmable gate array (FPGA) or another programmable logic device, a transistor logic device, a hardware component, or any combination thereof. The processor 701 may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor.

Figure 8:
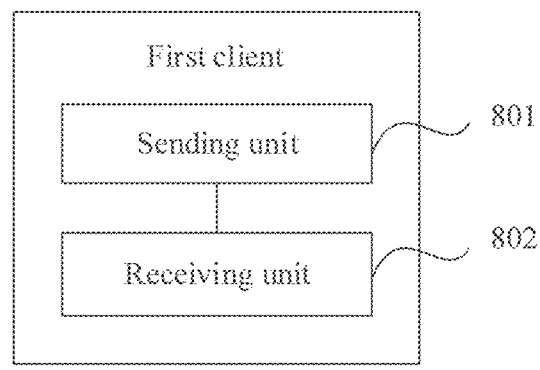
FIG. 8 is a schematic diagram of a logical structure of a first client according to an embodiment of the present disclosure.

When the function modules are obtained through division based on corresponding functions, FIG. 8 is a possible schematic diagram of a logical structure of a first client in the foregoing embodiments. The first client includes a sending unit 801 and a receiving unit 802. The sending unit 801 is configured to support the sending steps of the first client in the method embodiments shown in FIG. 3 to FIG. 5C. The receiving unit 802 is configured to support receiving steps of the first client in the method embodiments shown in FIG. 3 to FIG. 5C.

In hardware implementation, the sending unit 801 may be a transmitter, a transmitter circuit, or the like, the receiving unit 802 may be a receiver, a receiver circuit, or the like, and the sending unit 801 and the receiving unit 802 may form a communications interface.

Figure 9:
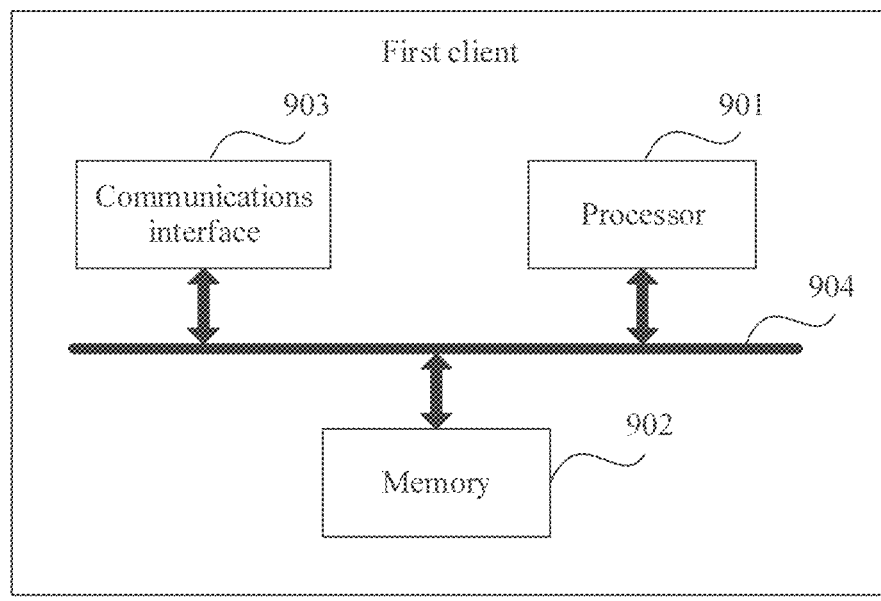
FIG. 9 is a schematic diagram of a hardware structure of a first client according to an embodiment of the present disclosure.

FIG. 9 is a possible schematic diagram of a hardware structure of a first client in the foregoing embodiments according to an embodiment of this application. The first client includes a processor 901. In this embodiment of this application, the processor 901 is configured to control and manage an action of the first client in the embodiments. Optionally, the first client may further include a memory 902 and a communications interface 903. The processor 901, the communications interface 903, and the memory 902 may be connected to each other or connected to each other through a bus 904. The memory 902 is configured to store program code and data of the first client, and the communications interface 903 is configured to support communication of the first client. The processor 901 invokes the code stored in the memory 902 to perform control management. The memory 902 may be coupled to or not coupled to the processor.

The processor 901 may be a CPU, a general-purpose processor, a DSP, an ASIC, an FPGA or another programmable logic device, a transistor logic device, a hardware component, or any combination thereof. The processor 901 may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor.

Figure 10:
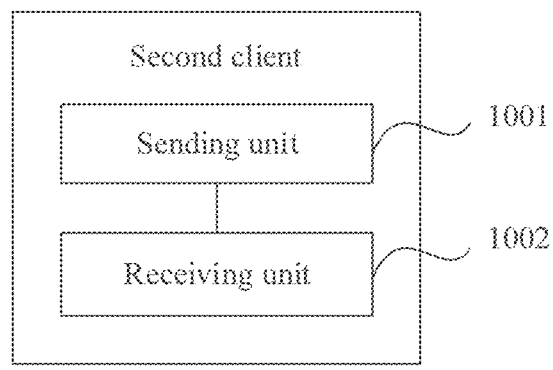
FIG. 10 is a schematic diagram of a logical structure of a second client according to an embodiment of the present disclosure.

When the function modules are obtained through division based on corresponding functions, FIG. 10 is a possible schematic diagram of a logical structure of a second client in the foregoing embodiments. The second client includes a sending unit 1001 and a receiving unit 1002. The sending unit 1001 is configured to support the sending steps of the second client in the method embodiments. The receiving unit 1002 is configured to support the receiving steps of the second client in the method embodiments.

In hardware implementation, the sending unit 1001 may be a transmitter, a transmitter circuit, or the like, the receiving unit 1002 may be a receiver, a receiver circuit, or the like, and the sending unit 1001 and the receiving unit 1002 may form a communications interface.

Figure 11:
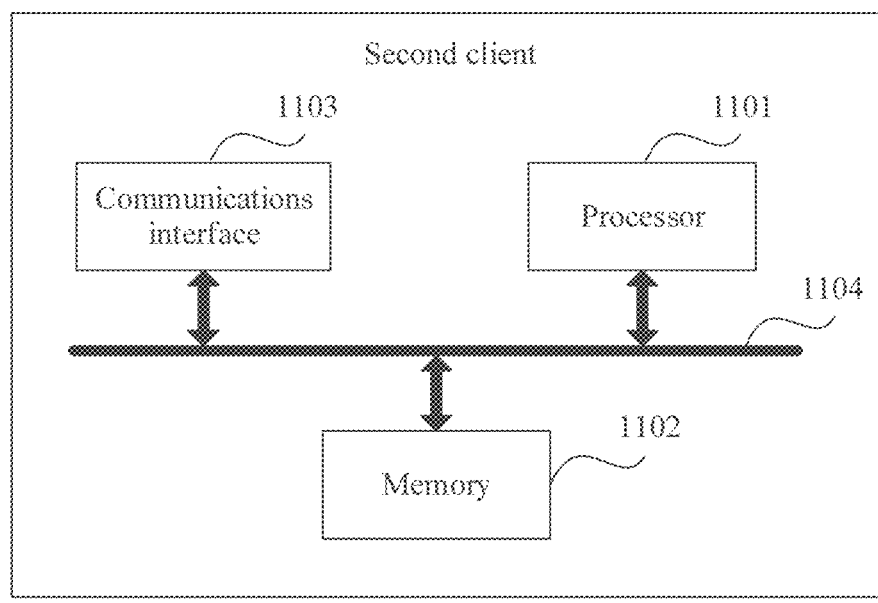
FIG. 11 is a schematic diagram of a hardware structure of a second client according to an embodiment of the present disclosure.

FIG. 11 is a possible schematic diagram of a hardware structure of a second client in the foregoing embodiments according to an embodiment of this application. The second client includes a processor 1101. In this embodiment of this application, the processor 1101 is configured to control and manage an action of the second client in the embodiments. Optionally, the second client may further include a memory 1102 and a communications interface 1103. The processor 1101, the communications interface 1103, and the memory 1102 may be connected to each other or connected to each other through a bus 1104. The memory 1102 is configured to store program code and data of the second client, and the communications interface 1103 is configured to support communication of the second client. The processor 1101 invokes the code stored in the memory 1102 to perform control management. The memory 1102 may be coupled to or not coupled to the processor.

The processor 1101 may be a CPU, a general-purpose processor, a DSP, an ASIC, an FPGA or another programmable logic device, a transistor logic device, a hardware component, or any combination thereof. The processor 1101 may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 1104 may be a PCI bus, an EISA bus, or the like.

In another embodiment of this application, a computer storage medium is further provided. The computer storage medium stores a computer executable instruction. A device (which may be a single-chip microcomputer, a chip, or the like) or a processor may invoke the computer executable instruction stored in a readable storage medium, to perform steps of the metadata server, the first client, or the second client in the data storage methods provided in FIG. 3 to FIG. 5C. The computer storage medium may include any medium that can store program code, such as a Universal Serial Bus (USB) flash drive, a removable hard disk, a read-only memory (ROM), a random-access memory (RAM), a magnetic disk, or an optical disc.

In another embodiment of this application, a computer program product is further provided. The computer program product includes a computer executable instruction, and the computer executable instruction is stored in a computer readable storage medium. At least one processor of a device may read the computer executable instruction from the computer readable storage medium, and when the at least one processor executes the computer executable instruction, the device is enabled to perform the steps of the metadata server, the first client, or the second client in the data storage method provided in FIG. 3 or FIG. 5A to FIG. 5C.

In another embodiment of this application, a distributed file system is further provided. The distributed file system includes a plurality of devices, and the plurality of devices include a metadata server, a first client, and a second client. The metadata server may be the metadata server provided in FIG. 6 or FIG. 7, and is configured to perform the steps of the metadata server in the data storage methods provided in FIG. 3 to FIG. 5C, and/or the first client may be the first client provided in FIG. 8 or FIG. 9, and is configured to perform the steps of the first client in the data storage methods provided in FIG. 3 to FIG. 5C, and/or the second client may be the second client provided in FIG. 10 or FIG. 11, and is configured to perform the steps of the second client in the data storage methods provided in FIG. 3 to FIG. 5C.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

Still another aspect of this application provides a device. The device includes a processor, and the processor runs code in a memory, to enable the device to perform the foregoing methods. The memory stores data and the code. The memory is located in the device, and the memory is coupled to the processor. The memory may alternatively be located outside the device.

All or some of the foregoing embodiments may be implemented by software, hardware, firmware, or any combination thereof. When software is used to implement the embodiments, all or some of the embodiments may be implemented in the form of a computer program product. The computer program product includes one or more computer instructions. When the computer program instructions are loaded and executed on a computer, the procedure or functions according to the embodiments of the present disclosure are completely or partially generated. The computer may be a general-purpose computer, a dedicated computer, a computer network, or other programmable apparatuses. The computer instructions may be stored in a computer readable storage medium or may be transmitted from one computer readable storage medium to another computer readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

In conclusion, the foregoing descriptions are merely examples of the embodiments of the present disclosure, but are not intended to limit the protection scope of the present disclosure. Any modification, equivalent replacement, or improvement made with respect to the present disclosure shall fall within the protection scope of the present disclosure.

What is claimed is:

1. A data storage method, comprising:
receiving, from a first client, a third lock request requesting to lock a first version of a first file;
locking the first version when the first file is not locked;
starting a lock timing of the first version of the first file;
updating a reference count of a file lock indicating that the first client has a lock on the first version;
sending, to the first client, a fourth lock response indicating that the first version is locked;
receiving, from a second client, a fourth lock request requesting to lock a second version of the first file;
sending a fifth lock response to the second client when the first version is locked and when the second version is the same as the first version, wherein the fifth lock response indicates that the first version is locked;
updating, when the second version is the same as the first version, the reference count of the file lock indicating that the second client has a lock on the first version;
updating, when the second version is the same as the first version, the lock timing of the first version of the first file to restart the lock timing based on an operation time in which the second client locks the first version of the first file;
receiving, from the first client, a first lock request requesting to lock a first data range of the first file, wherein the first data range indicates a data range for the first client to write data;
locking the first data range when the first data range is not locked;
sending, to the first client, a first lock response indicating that the first data range is locked;
receiving, from the second client, a second lock request requesting to lock a second data range of the first file;
when the second data range is not locked, locking the second data range, and sending, to the second client, a second lock response indicating that the second data range is locked; and
when identifying in the second data range requested by the second lock request a third data range that is already locked prior to the second lock request and a fourth data range that is not previously locked based on a previous lock request, locking the fourth data range, and sending, to the second client in response to locking the fourth data range, a third lock response comprising range information of the fourth data range and an indication that the fourth data range is locked.

2. The data storage method of claim 1, wherein after receiving the fourth lock request, the data storage method further comprises:
identifying when the first version is locked and the second version is different from the first version; and
sending, in response to the identifying, a lock failure indication message to the second client.

3. The data storage method of claim 1, wherein the fourth lock response comprises a first token corresponding to the first version, wherein the first lock request comprises a second token, and wherein after receiving the first lock request and before sending the first lock response, the data storage method further comprises:
comparing the second token to the first token; and
sending, to the first client, the first lock response when the second token is same as the first token and when the first data range is not locked.

4. The data storage method of claim 1, wherein after sending the first lock response, the data storage method further comprises:
receiving, from the first client, a first unlock request requesting to unlock the first data range;
unlocking the first data range; and
sending a first unlock response to the first client.

5. The data storage method of claim 1, wherein after sending the fourth lock response, the data storage method further comprises:
receiving, from the first client, a second unlock request requesting to unlock the first version;
unlocking the first version; and
sending a second unlock response to the first client.

6. The data storage method of claim 1, wherein after locking the first version, the data storage method further comprises:
unlocking the first version when the lock timing reaches a first preset period and when an unlock request from a client for the first version has not been received.

7. The data storage method of claim 1, wherein after locking the first data range, the data storage method further comprises:
starting a lock timing of the first data range; and
unlocking the first data range when the lock timing reaches a second preset period and when an unlock request from the first client for the first data range has not been received.

8. The data storage method of claim 1, wherein before receiving the second lock request, the second data range includes the third data range that is locked and the fourth data range that is not locked.

9. The data storage method of claim 1, wherein the third lock response indicates that the fourth data range in the second data range of the first file is locked by the second client.

10. The data storage method of claim 1, wherein after locking the first version of the first file, content of each version of the first file other than the first version is prevented from locking or modification.

11. A metadata server comprising:
a memory configured to store instructions; and
one or more processors in coupled to the memory and configured to execute the instructions to cause the metadata server to:
receive, from a first client, a third lock request requesting to lock a first version of a first file;
lock the first version when the first file is not locked;
start a lock timing of the first version of the first file;
update a reference count of a file lock indicating that the first client has a lock on the first version;
send, to the first client, a fourth lock response indicating that the first version is locked;
receive, from a second client, a fourth lock request requesting to lock a second version of the first file;
send a fifth lock response to the second client when the first version is locked and when the second version is the same as the first version, wherein the fifth lock response indicates that the first version is locked;
update, when the second version is the same as the first version, the reference count of the file lock indicating that the second client has a lock on the first version;
update, when the second version is the same as the first version, the lock timing of the first version of the first file to restart the lock timing based on an operation time in which the second client locks the first version of the first file;

receive, from the first client, a first lock request requesting to lock a first data range of the first file;

lock the first data range when the first data range is not locked;

send, to the first client, a first lock response indicating that the first data range is locked;

receive, from the second client, a second lock request requesting to lock a second data range of the first file;

when the second data range is not locked, lock the second data range, and send, to the second client, a second lock response indicating that the second data range is locked; and when identifying in the second data range requested by the second lock request a third data range that is already locked prior to the second lock request and a fourth data range that is not previously locked based on a previous lock request, lock the fourth data range, and send, to the second client in response to locking the fourth data range, a third lock response comprising range information of the fourth data range and an indication that the fourth data range is locked.

12. The metadata server of claim 11, wherein after sending the first lock response, the one or more processors further cause the metadata server to:

receive, from the first client, a first unlock request from the first client requesting to unlock the first data range;

unlock the first data range; and send a first unlock response to the first client.

13. The metadata server of claim 11, wherein after locking the first version, the one or more processors further cause the metadata server to:

unlock the first version when the lock timing reaches a first preset period and when the metadata server has not received an unlock request from a client for the first version.

14. The metadata server of claim 11, wherein after locking the first version, the one or more processors further cause the metadata server to:

start a lock timing of the first data range; and unlock the first data range when the lock timing reaches a second preset period and when the metadata server has not received an unlock request from the first client for the first data range.

15. The metadata server of claim 11, wherein before receiving the second lock request, the second data range includes the third data range that is locked and the fourth data range that is not locked.

16. The metadata server of claim 11, wherein the third lock response indicates that the fourth data range in the second data range of the first file is locked by the second client.

17. The metadata server of claim 11, wherein after locking the first version, content of each version of the first file other than the first version is prevented from locking or modification.

* * * * *